(12) United States Patent
Gowda et al.

(10) Patent No.: US 9,819,604 B2
(45) Date of Patent: Nov. 14, 2017

(54) REAL TIME NETWORK ADAPTIVE LOW LATENCY TRANSPORT STREAM MUXING OF AUDIO/VIDEO STREAMS FOR MIRACAST

(71) Applicant: NVIDIA Corporation, Santa Clara, CA (US)

(72) Inventors: Rahul Gowda, Daly City, CA (US); Olivier Lapicque, San Jose, CA (US); Thomas Meier, Cupertino, CA (US)

(73) Assignee: Nvidia Corporation, Santa Clara, CA (US)

( * ) Notice: Subject to any disclaimer, the term of this patent is extended or adjusted under 35 U.S.C. 154(b) by 208 days.

(21) Appl. No.: 13/955,965

(22) Filed: Jul. 31, 2013

(65) Prior Publication Data
US 2015/0036695 A1 Feb. 5, 2015

(51) Int. Cl.
*H04L 12/875* (2013.01)
*H04L 12/823* (2013.01)
(Continued)

(52) U.S. Cl.
CPC .............. *H04L 47/56* (2013.01); *H04L 47/19* (2013.01); *H04L 47/283* (2013.01); *H04L 47/32* (2013.01); *H04N 21/2368* (2013.01); *H04N 21/23608* (2013.01); *H04N 21/43615* (2013.01); *H04N 21/43637* (2013.01); *H04N 21/64792* (2013.01)

(58) Field of Classification Search
None
See application file for complete search history.

(56) References Cited

U.S. PATENT DOCUMENTS 5,467,342 A * 11/1995 Logston et al. ............... 370/253
5,668,601 A * 9/1997 Okada et al. ............ 375/240.25
(Continued)

FOREIGN PATENT DOCUMENTS

EP 2073552 6/2009
TW 20144101 11/2010
(Continued)

OTHER PUBLICATIONS

Sudhakaran, Sareesh. The Difference between Encoding, Transcoding and Rendering (online). Wolfcrow, Jan. 29, 2013. Retrieved from the Internet: URL: http//web.archive.org/web/20130511025703/http://wolfcrow.com/blog/the-dfference-between-encoding-transcoding-and-rendering.
(Continued)

*Primary Examiner* — Hicham Foud (57) ABSTRACT

Systems and methods for multiplexing audio/video data and generating transport streams for WiFi network with reduced latency for real time playback at a remote device. A virtual presentation clock reference (PCR) representing a scheduled transmission time of a transport stream packet at a transport stream multiplexer is calculated based on the network transmission rate and generation of the data packets. The virtual PCR is compared with the corresponding system PCR to derive a time difference. Based on the time difference, the transport stream multiplexer is configured to adaptively drop packets or throttle packet generation so as to synchronize the playback of audio/video data on a sink device with the generation of interleaved audio/video packets.

22 Claims, 7 Drawing Sheets

(51) Int. Cl.
  *H04L 12/841* (2013.01)
  *H04L 12/801* (2013.01)
  *H04N 21/436* (2011.01)
  *H04N 21/236* (2011.01)
  *H04N 21/2368* (2011.01)
  *H04N 21/4363* (2011.01)
  *H04N 21/647* (2011.01)

(56) References Cited

U.S. PATENT DOCUMENTS

| | | | | |
|---|---|---|---|---|
| 5,790,543 | A * | 8/1998 | Cloutier | 370/252 |
| 5,966,387 | A * | 10/1999 | Cloutier | 370/516 |
| 6,081,299 | A * | 6/2000 | Kesselring | 348/512 |
| 6,157,674 | A * | 12/2000 | Oda et al. | 375/240 |
| 6,263,396 | B1 * | 7/2001 | Cottle et al. | 710/263 |
| 6,421,050 | B1 | 7/2002 | Ruml et al. | |
| 6,429,902 | B1 * | 8/2002 | Har-Chen et al. | 348/518 |
| 6,665,751 | B1 | 12/2003 | Chen et al. | |
| 6,948,185 | B1 * | 9/2005 | Chapel et al. | 725/139 |
| 7,027,713 | B1 * | 4/2006 | Hallberg | 386/346 |
| 7,404,002 | B1 | 7/2008 | Pereira | |
| 7,516,255 | B1 | 4/2009 | Hobbs | |
| 7,558,869 | B2 * | 7/2009 | Leon | H04L 29/06027 370/235 |
| 7,870,496 | B1 | 1/2011 | Sherwani | |
| 7,940,801 | B2 * | 5/2011 | Gervais | H04J 3/0664 370/503 |
| 8,325,214 | B2 | 12/2012 | Hildreth | |
| 8,520,050 | B2 | 8/2013 | Blackburn et al. | |
| 8,555,328 | B2 * | 10/2013 | Emura | 725/114 |
| 8,687,008 | B2 | 4/2014 | Karandikar et al. | |
| 8,738,814 | B1 | 5/2014 | Cronin | |
| 8,745,280 | B1 | 6/2014 | Cronin | |
| 8,886,763 | B2 | 11/2014 | Bose et al. | |
| 9,619,916 | B2 | 4/2017 | Steinke | |
| 9,697,629 | B1 | 7/2017 | Vetter et al. | |
| 2002/0128822 | A1 * | 9/2002 | Kahn | 704/200.1 |
| 2002/0150126 | A1 * | 10/2002 | Kovacevic | 370/503 |
| 2003/0076848 | A1 * | 4/2003 | Bremler-Barr et al. | 370/412 |
| 2004/0057381 | A1 | 3/2004 | Tseng et al. | |
| 2004/0080533 | A1 | 4/2004 | Nishtala et al. | |
| 2004/0167893 | A1 | 8/2004 | Matsunaga et al. | |
| 2004/0239681 | A1 | 12/2004 | Robotham et al. | |
| 2004/0243257 | A1 | 12/2004 | Theimer | |
| 2005/0028222 | A1 | 2/2005 | Megeid | |
| 2005/0036546 | A1 | 2/2005 | Rey et al. | |
| 2005/0084232 | A1 | 4/2005 | Herberger et al. | |
| 2005/0091571 | A1 | 4/2005 | Leichtling | |
| 2005/0132264 | A1 | 6/2005 | Joshi et al. | |
| 2005/0175098 | A1 * | 8/2005 | Narasimhan et al. | 375/240.12 |
| 2006/0007958 | A1 * | 1/2006 | Kang et al. | 370/476 |
| 2006/0069799 | A1 | 3/2006 | Hundscheidt et al. | |
| 2006/0146850 | A1 * | 7/2006 | Virdi et al. | 370/412 |
| 2006/0165129 | A1 * | 7/2006 | Li | H04L 1/0014 370/503 |
| 2006/0165166 | A1 | 7/2006 | Chou et al. | |
| 2006/0184697 | A1 | 8/2006 | Virdi et al. | |
| 2006/0200253 | A1 | 9/2006 | Hoffberg et al. | |
| 2006/0230171 | A1 | 10/2006 | Dacosta | |
| 2006/0248559 | A1 * | 11/2006 | Michener et al. | 725/67 |
| 2006/0282855 | A1 | 12/2006 | Margulis | |
| 2007/0067480 | A1 | 3/2007 | Beek et al. | |
| 2007/0126875 | A1 | 6/2007 | Miyamaki | |
| 2007/0180106 | A1 | 8/2007 | Pirzada et al. | |
| 2007/0201388 | A1 | 8/2007 | Shah et al. | |
| 2007/0276954 | A1 * | 11/2007 | Chan et al. | 709/231 |
| 2007/0294173 | A1 | 12/2007 | Levy et al. | |
| 2008/0019398 | A1 * | 1/2008 | Genossar et al. | 370/498 |
| 2008/0022335 | A1 * | 1/2008 | Yousef | 725/100 |
| 2008/0052414 | A1 | 2/2008 | Panigrahi et al. | |
| 2008/0055311 | A1 | 3/2008 | Aleksic et al. | |
| 2008/0101466 | A1 | 5/2008 | Swenson et al. | |
| 2008/0165280 | A1 | 7/2008 | Deever et al. | |
| 2009/0207172 | A1 | 8/2009 | Inoue et al. | |
| 2009/0222873 | A1 | 9/2009 | Einarsson | |
| 2009/0225038 | A1 | 9/2009 | Bolsinga et al. | |
| 2009/0252227 | A1 | 10/2009 | Nepomucenoleung | |
| 2009/0284442 | A1 | 11/2009 | Pagan | |
| 2010/0020025 | A1 | 1/2010 | Lemort et al. | |
| 2010/0036963 | A1 | 2/2010 | Gahm et al. | |
| 2010/0052843 | A1 | 3/2010 | Cannistraro | |
| 2010/0063992 | A1 | 3/2010 | Ma et al. | |
| 2010/0064228 | A1 | 3/2010 | Tsern | |
| 2010/0135381 | A1 | 6/2010 | Hamamoto et al. | |
| 2010/0169842 | A1 | 7/2010 | Migos | |
| 2010/0201878 | A1 | 8/2010 | Barenbrug et al. | |
| 2010/0254622 | A1 | 10/2010 | Kamay et al. | |
| 2011/0058554 | A1 | 3/2011 | Jain et al. | |
| 2011/0106743 | A1 | 5/2011 | Duchon | |
| 2011/0145863 | A1 | 6/2011 | Alsina et al. | |
| 2011/0255841 | A1 | 10/2011 | Remennik et al. | |
| 2011/0263332 | A1 | 10/2011 | Mizrachi | |
| 2011/0270600 | A1 | 11/2011 | Bose et al. | |
| 2011/0271200 | A1 | 11/2011 | Kikkawa et al. | |
| 2011/0276710 | A1 | 11/2011 | Mighani et al. | |
| 2011/0314093 | A1 | 12/2011 | Sheu et al. | |
| 2012/0005365 | A1 | 1/2012 | Ma et al. | |
| 2012/0033140 | A1 | 2/2012 | Xu | |
| 2012/0054671 | A1 | 3/2012 | Thompson et al. | |
| 2012/0076197 | A1 | 3/2012 | Byford et al. | |
| 2012/0092277 | A1 | 4/2012 | Momchilov | |
| 2012/0092299 | A1 | 4/2012 | Harada et al. | |
| 2012/0092563 | A1 | 4/2012 | Kwon et al. | |
| 2012/0230389 | A1 * | 9/2012 | Laurent et al. | 375/240.01 |
| 2012/0250762 | A1 | 10/2012 | Kaye et al. | |
| 2012/0254456 | A1 | 10/2012 | Visharam et al. | |
| 2012/0262379 | A1 | 10/2012 | King | |
| 2012/0265892 | A1 | 10/2012 | Ma et al. | |
| 2012/0311043 | A1 | 12/2012 | Chen et al. | |
| 2012/0317236 | A1 | 12/2012 | Abdo et al. | |
| 2013/0031482 | A1 | 1/2013 | Saul et al. | |
| 2013/0093776 | A1 | 4/2013 | Chakraborty et al. | |
| 2013/0097309 | A1 | 4/2013 | Ma et al. | |
| 2013/0107930 | A1 | 5/2013 | Le Faucheur et al. | |
| 2013/0111019 | A1 | 5/2013 | Tjew et al. | |
| 2013/0120651 | A1 | 5/2013 | Perry | |
| 2013/0159393 | A1 | 6/2013 | Imai et al. | |
| 2013/0246932 | A1 | 9/2013 | Zaveri et al. | |
| 2013/0254330 | A1 | 9/2013 | Maylander et al. | |
| 2013/0290858 | A1 | 10/2013 | Beveridge | |
| 2013/0300633 | A1 | 11/2013 | Horio et al. | |
| 2013/0307847 | A1 | 11/2013 | Dey et al. | |
| 2014/0053025 | A1 | 2/2014 | Marvasti et al. | |
| 2014/0068520 | A1 | 3/2014 | Missig et al. | |
| 2014/0085314 | A1 | 3/2014 | Steinke | |
| 2014/0108940 | A1 | 4/2014 | Diercks et al. | |
| 2014/0122562 | A1 | 5/2014 | Turner et al. | |
| 2014/0143296 | A1 | 5/2014 | Odorovic et al. | |
| 2014/0143297 | A1 | 5/2014 | Ibarria | |
| 2014/0189091 | A1 | 7/2014 | Tamasi et al. | |
| 2014/0380182 | A1 | 12/2014 | Lu et al. | |
| 2015/0019670 | A1 | 1/2015 | Redmann | |
| 2015/0026309 | A1 | 1/2015 | Radcliffe et al. | |
| 2015/0207837 | A1 | 7/2015 | Guerrera et al. | |
| 2015/0215359 | A1 | 7/2015 | Bao et al. | |
| 2015/0340009 | A1 | 11/2015 | Loeffler et al. | |

FOREIGN PATENT DOCUMENTS

| | | |
|---|---|---|
| TW | 201041401 | 11/2010 |
| TW | 201202975 | 1/2012 |
| TW | 201223256 | 6/2012 |
| TW | 201230850 | 7/2012 |

OTHER PUBLICATIONS

Sudhakaran, Sareesh. The difference between Encoding, Transcoding and Rendering (online). Wolfcrow, Jan. 29, 2013. Retrieved from the Internet: URL: http//web.archive.org/

(56) References Cited

OTHER PUBLICATIONS wewb20130511025703/http://wolfcrow.com/blog/the-difference-between-encoding-transcoding-and rendering.

* cited by examiner

REAL TIME NETWORK ADAPTIVE LOW LATENCY TRANSPORT STREAM MUXING OF AUDIO/VIDEO STREAMS FOR MIRACAST

TECHNICAL FIELD

The present disclosure relates generally to the field of multiplexing of audio/video data, and, more specifically, to the field of multiplexing of audio/video data for transport stream.

BACKGROUND

With rapid growth of mobile computing devices, such as laptops, smart phones and touchpads, it has been increasingly popular to use these as source devices to stream multimedia data, including audio and video data, through WiFi networks and for playback on a remote display on a sink device in real time. Especially, the development of Miracast wireless technology enables the devices to be used to stream videos, movies, games, and webpages to external high definition displays without the mediation of a wireless access point. Wi-Fi Direct allows source and display devices to discover one another and provides the underlying device-to-device connectivity for Miracast. Miracast builds upon Wi-Fi Direct with mechanisms to negotiate video capabilities, setup content protection (if needed), stream content, and maintain the video session.

The transmission of audio and video data generally involves capturing data from various devices, such as screen capture from a computer, or audio/video capture from cameras, multiplexing the audio and video data together to form packages that are then transmitted through a communication network in the form of transport steams (TS) such as defined in an MPEG format.

Conventionally, transport Stream had been designed for broadcast or offline applications, and so the associated multiplexers designed to process data for such purposes e.g. through satellite networks or cable networks, where latency rarely poses concern. However, in the context of real time playback of the streamed audio/video, latency between data capture on the source device and playback on the sink device can cause disadvantageous and conspicuous discontinuity of play on the sink display and thus problematic.

SUMMARY OF THE INVENTION

It would be advantageous to provide a mechanism to reduce latency in transport stream multiplexing for real time audio/video stream playback for WiFi network. Accordingly, embodiments of the present disclosure employ a transport stream multiplexer that is capable of synchronizing the playback of audio/video data on a sink device with the generation of interleaved audio/video packets by virtue of adaptive packet dropping/throttling processes. A virtual presentation clock reference (PCR) representing a scheduled transmission time of a transport stream packet is calculated based on the network transmission rate and generation of the transport stream packets. The virtual PCR is compared with the corresponding system PCR to derive a time difference. If the time difference indicates that the generation of the transport stream lags behind at the transport stream multiplexer, the multiplexer is capable of selectively dropping packets and incrementing the Virtual PCR accordingly until the virtual PCR and the system VCR become contemporaneous. If the time difference indicates that the generation of the transport stream is faster than the transmission thereof, the multiplexer is capable of throttling packet generation accordingly until the virtual PCR and the system PCR become contemporaneous. This may also save power. Thereby, the transmission latency can be reduced and the real time playback at a sink device can maintain continuity and synchronization with the audio/video capture.

In one embodiment of present disclosure, a method of transmitting an audio/video mixed signal over a communication network comprises: (1) accessing a packetized stream comprising audio payloads and video payloads; (2) assigning the audio payloads in a audio queue and the video payloads in a video queue; (3) converting the packetized stream into a transport stream comprising a plurality of packets that comprise interleaved audio packets and video packets, wherein each of the plurality of packets comprises a transport header and a payload; (4) deriving a virtual clock reference based on a transmission bandwidth through the communication network with respect to the plurality of packets; (5) deriving a time difference between the virtual clock reference and a system clock reference with respect to transmission of the plurality of packets through the communication network; and (6) if the time difference indicates that the virtual clock reference falls behind the system clock reference by at least a threshold, selectively dropping a number of payloads until the virtual PCR and the system clock reference are determined to be synchronous. The method may further comprise exclusively dropping payloads from selected video packets before dropping an audio payload, avoiding dropping a video payload that comprises a reference video frame, and avoiding dropping a payload that comprises a packetized elementary stream header (PES). The method may further comprise incrementing the virtual clock reference each time a payload is dropped or a packet is transmitted, and incrementing the system clock reference each time a packet is transmitted. If the virtual clock reference is ahead of the system lock reference, the transmission may be suspended. The method may further comprise sending a physical null packet or a virtual null packet while the audio and video queues are empty and incrementing the virtual clock reference accordingly.

In another embodiment of present disclosure, a non-transitory computer-readable storage medium comprising instructions for transmitting signals over a wireless network, the instructions for: (1) receiving a packetized elementary stream (PES) comprising audio payloads and video payloads; (2) enqueuing the audio payloads in a audio queue and the video payloads in a video queue; (3) inserting a header to the PES; (4) packetizing the PES into a plurality of transport packets that comprise multiplexed audio packets and video packets, wherein each of the plurality of transport packets comprises a transport header and a payload; (5) calculating a virtual clock reference based on a transmission bandwidth of the wireless network; (6) deriving a time difference between the virtual clock reference and a system clock reference; and (7) if the time difference indicates that the virtual clock reference falls behind the system clock reference by at least a threshold, selectively dropping a number of payloads until the virtual clock reference and the system clock reference is determined to be synchronous.

In another embodiment of present disclosure, a device operable to transmit audio/video payloads to a remote computing device through a communication network, the device comprising: a processor; a network circuit enabling the device to access with the communication network; a memory coupled with the network circuit, the memory operable to store instructions that, when executed by the processor, perform a method of: (1) accessing a packetized stream comprising audio payloads and video payloads; (2) enqueuing the audio payloads in a audio queue and the video payloads in a video queue; (3) inserting a header to the packetized stream; (4) packetizing the packetized stream into a plurality of transport packets that comprise multiplexed audio packets and video packets, wherein each of the plurality of transport packets comprises a transport header and a payload; (5) calculating a virtual clock based on a transmission bandwidth of the communication network; (6) deriving a time difference between the virtual clock and a system clock with respect to transmission of the plurality of transport packets; and (7) if the time difference indicates that the virtual PCR falls behind the system PCR by at least a threshold latency, selectively dropping a number of payloads until the virtual PCR and the system PCR is determined to be synchronous.

This summary contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying drawing figures in which like reference characters designate like elements and in which.

DETAILED DESCRIPTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Notation and Nomenclature

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

Figure 1:
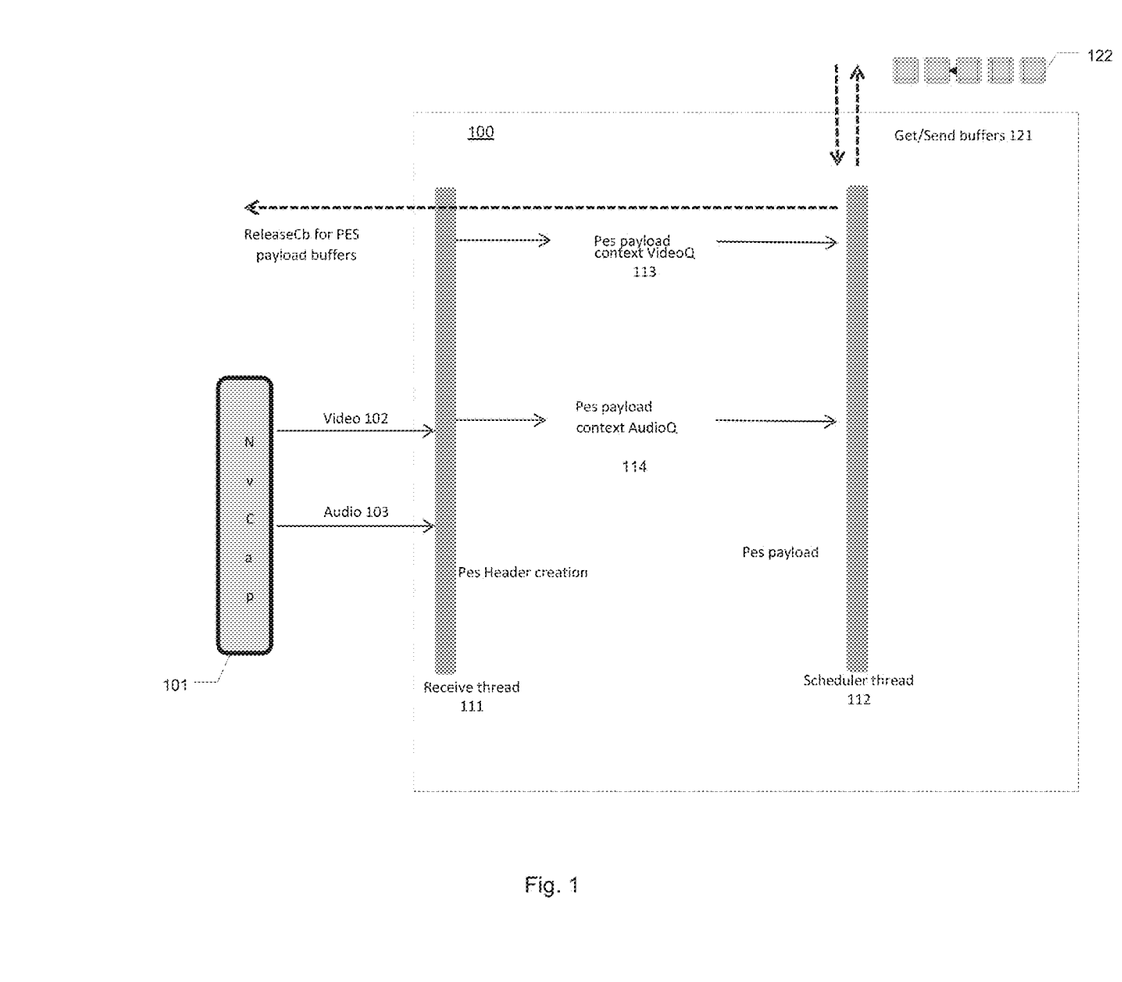
FIG. 1 is an architecture of an exemplary transport multiplexer (TsMUX) capable of generating transport packets by interleaving audio and video payloads from a packetized elementary stream (PES).

Real Time Network Adaptive Low Latency Transport Stream Muxing of Audio/Video Streams for Miracast FIG. 1 illustrates an exemplary architecture of a transport multiplexer (TsMUX) 100 capable of generating transport stream packets by interleaving audio and video payloads from a packetized elementary stream (PES). The transport multiplexer 100 can be implemented as a software program or a combination of software and hardware. The PES includes a video stream 102, such as an MPEG video stream, and an audio stream 103, such as a DTS, and AAC, or an AC3 audio stream. The video 102 and audio 103 streams may be generated and encoded by a capture module 101. The TsMUX 100 can interleave the video 102 and audio 103 stream into a transport stream 122 which is transmitted through a WiFi network to a receiver or sink device, for instance, for de-multiplexing and playback in substantially real time. In accordance with the present disclosure, the TsMUX 100 can selectively drop a payload or packet based on timing information regarding the packets transmission and can reduce latency accordingly. Thereby the real time playback of data at the sink device can be advantageously synchronized with audio/video capture at the source device and playback continuity can be improved.

According to the illustrated embodiment, the implementation of the TsMUX 100 may comprise two execution threads, a receive thread and a scheduler thread. The TsMUX can request buffers assigned for an associated client program. Upon receiving the PES, the receive thread can create PES headers and insert them in the packets, enqueue the audio and video payload to their respective queues, and notify the scheduler thread of the PES arrival or payload submission event.

Based on the information contained in a PES header the scheduler thread 112 can select queues 113 and 114 to read data, interleave the audio and video payloads, and insert transport headers to generate a transport stream 122. The transport stream 122 is buffered at the output buffer 121 and then sent to the client program from which the data may be transmitted via a WiFi network to another device, e.g., a sink device, for demultiplexing playback. In some embodiments, the scheduler thread may remain in a sleep mode until a payload is received by the receive thread.

In some embodiments, the TsMUX 100 maintains no internal copy of the audio/video data. In some embodiments, the receive thread may be associated with an internal circular buffer that operate to decouple the TsMUX 100 from the capture module 101 to avoid backpressure thereon.

Figure 2:
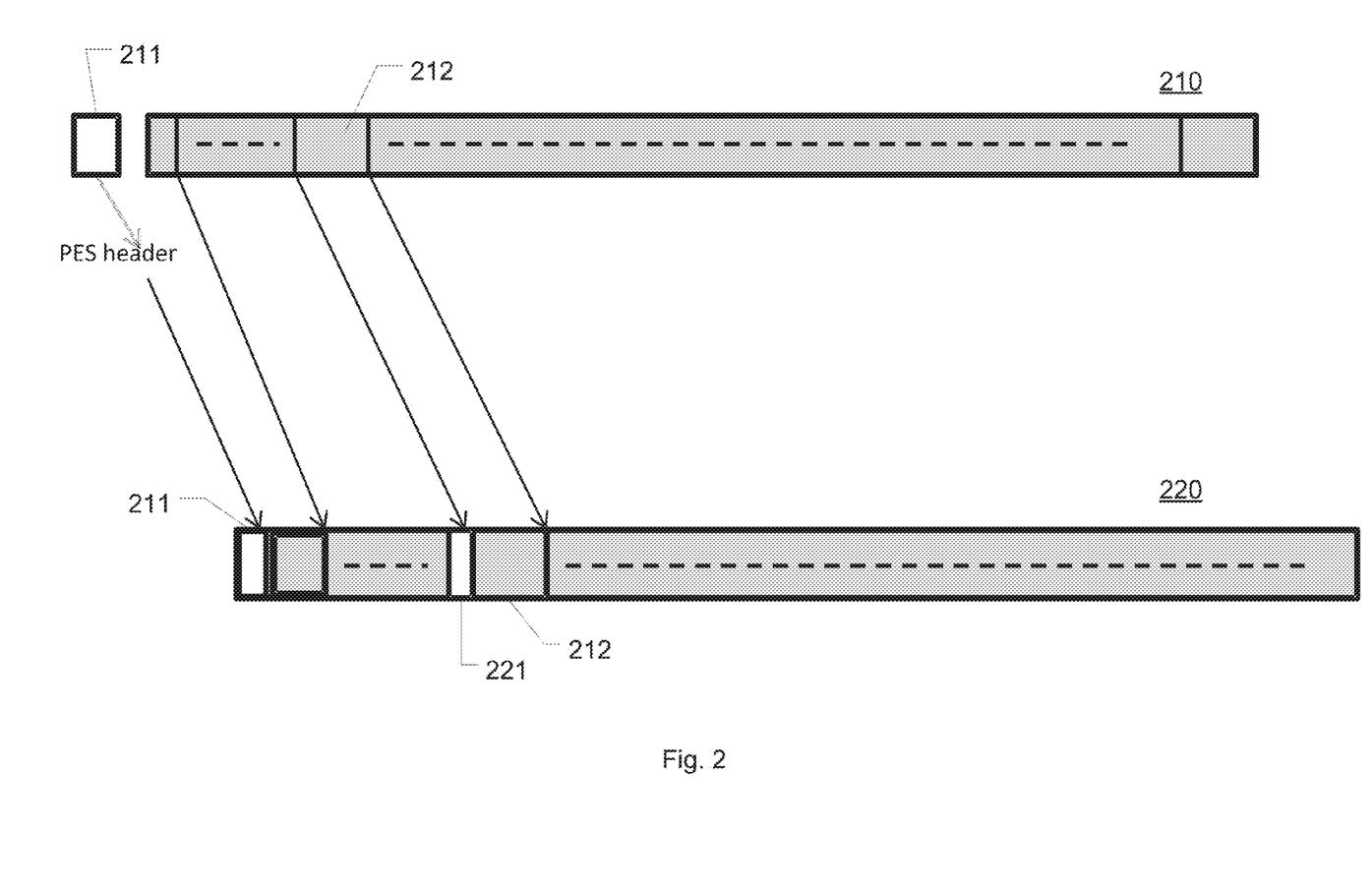
FIG. 2 illustrates the packetization process of a transport stream packet from a PES packet supplied from an upstream audio/video capture program.

FIG. 2 illustrates the exemplary packetization process of a transport stream packet from a PES packet supplied from an upstream audio/video capture program. The PES packet is first stored at the elementary stream buffer 210 and then copied to the output buffer 220. The scheduler thread of the TsMUX does not maintain an internal copy of the payloads but can obtain output buffers from an application program, e.g., a socket program. The PES packet in 210 comprises a PES header 211 and a payload 212 of 184 bytes for instance. A PES payload typically represents only one type of data, either audio or video. The PES header 211 may contain a presentation time stamp (PTS) representing the time at which a decoded audio or video access unit is to be presented by the decoder, or a decode time stamp (DTS) representing the time at which an access unit is decoded by the decoder.

At the time of copy to the output buffer 220 the PES header 211 and the payload 212 are preserved. In addition, a transport header, e.g., 4 or 8 bytes, that include information regarding the type of payloads and clock information, is created and inserted between the PES header 211 and the payload 212. Thus, the transport packet 220 includes a PES header 211, a transport stream header 221 and the video or audio payload 212. In this manner, the packets containing audio and video payloads are interleaved and copied to the output buffer until transmitted. The content of the headers and the sizes of the headers and the payloads are generated in accordance with a specification defined by a standard, such as Mpeg2 Transport Stream.

Figure 3:
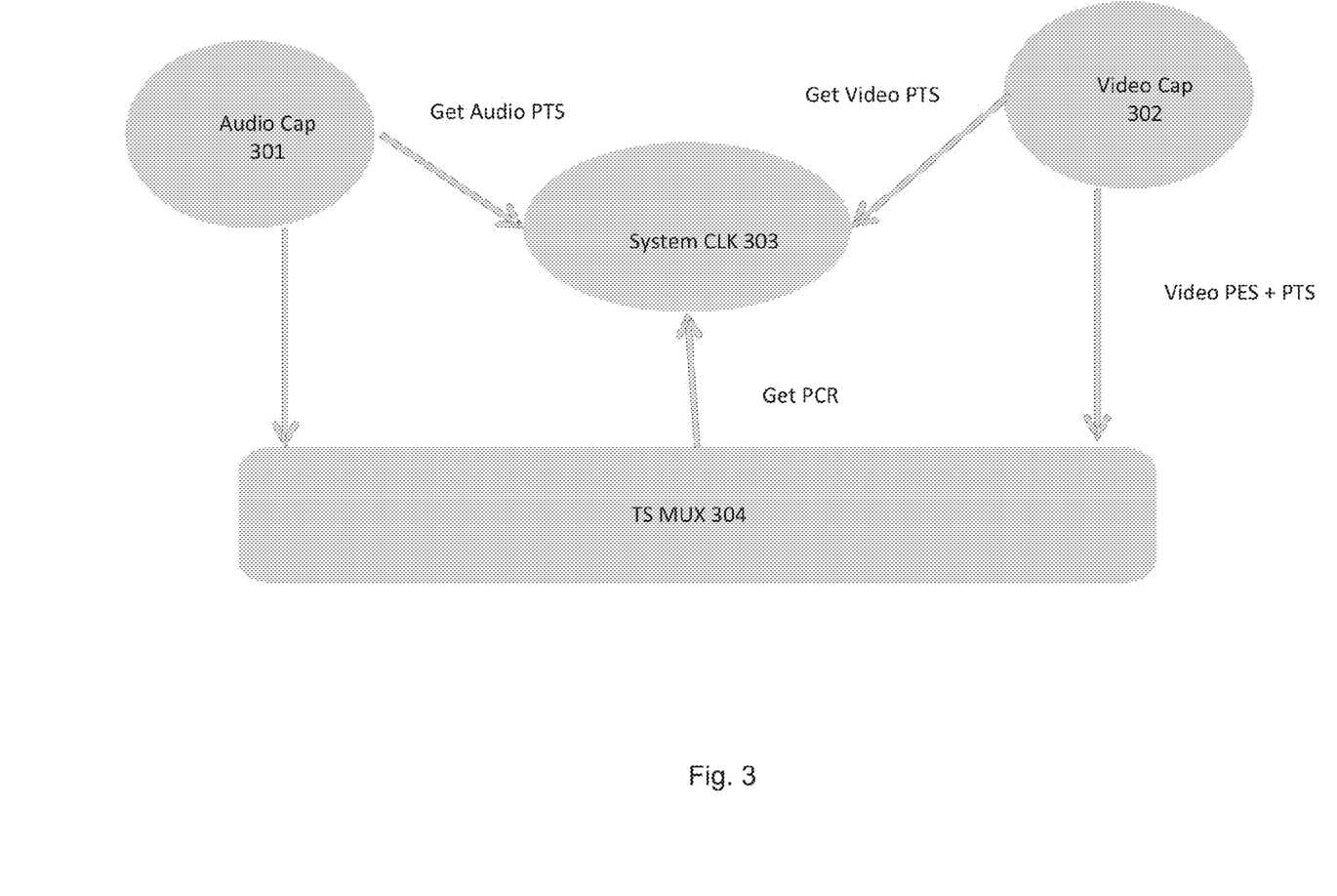
FIG. 3 illustrates the generation and placement of the time information based on which the TsMUX can reduce latency in accordance with an embodiment of the present disclosure.

FIG. 3 illustrates the generation of time information used by the TsMUX to reduce latency in accordance with an embodiment of the present disclosure. The audio capture program 301 and the associated video capture program 302 can generate respective PTS with reference to the system clock 303, along with the respective PES payloads. The PTSs are submitted to the TsMUX 304 in the elementary stream. The TsMUX 304 can obtain a system PCR and generate a virtual PCR with reference to the system clock 303 as well. The TsMUX can insert a time of (PCR-constant latency) in the transport stream. As shown, related time information including the PTSs and the PCRs are all derived from the system clock 303.

Figure 4:
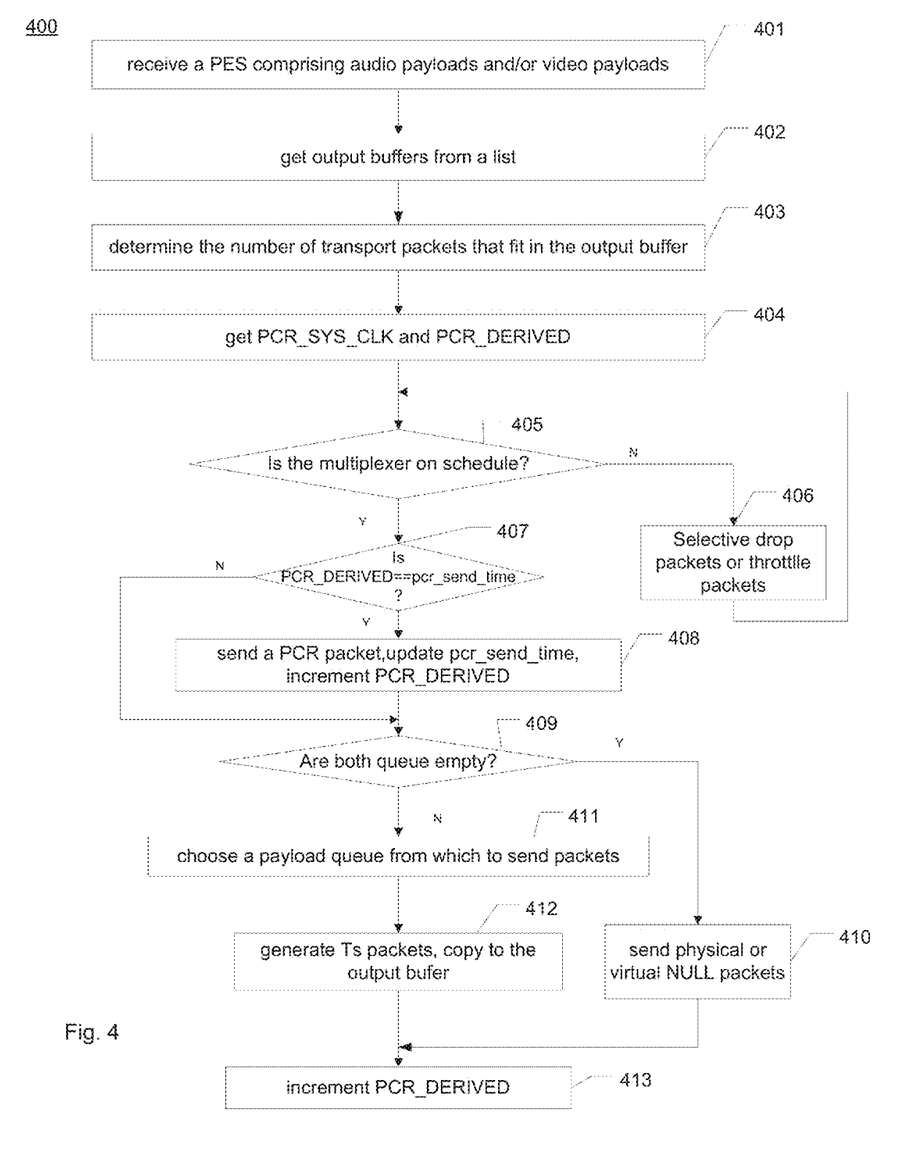
FIG. 4 is a flow chart illustrating an exemplary method that uses the TsMUX to generate an interleaved audio/video transport stream with low latency in accordance with an embodiment of the present disclosure.

FIG. 4 is a flow chart illustrating an exemplary method 400 that uses the TsMUX to generate an interleaved audio/video transport stream with low latency in accordance with an embodiment of the present disclosure. Instructions that perform method 400 can be executed by the schedule thread of a TsMUX. At 401, an elementary stream including related audio and video packets are received by the TsMUX. In some embodiments, the scheduler thread may remain in a sleep mode until, e.g., such a payload has been placed in the corresponding queue by the receive thread.

At 402, the TsMUX obtains output buffers to store the transport stream packets after they are interleaved and before they are transmitted via the network. The TsMUX can request a client program to allocate buffers and maintain an internal list of the available buffers. Once the list is depleted, the TsMUX may request for additional buffers. When the TsMUX gets the output buffer from the list, the TsMUX can determine the amount of packet that can be fit in the buffer at 403.

At 404, the TsMUX gets clock information including the system PCR clock (PCR_SYS_CLK) and a virtual PCR clock (PCR_DERIVED). The system PCR clock represent the actual timing of sending a packet to the network. The virtual PCR clock represents a scheduled time of sending a packet and is calculated based on the number of packets that have been generated and the bandwidth or transmission rate of the network. Each time a packet is sent to the network, the virtual reference clock can be incremented or updated.

At 405, the TsMUX determines if the system PCR and virtual PCR are contemporaneous with each other. If not, the TsMUX selectively and intelligently drops or throttle packets at 406 in order to keep synchronization of the multiplexing and the transmission, as will be discussed in greater details with reference to FIG. 5.

If the TsMUX is on schedule as indicated by comparison of system PCR and the virtual PCR at 405, the TsMUX checks if PCR_DERIVED is equal to per_send_time which indicates the time to send a packet including the virtual PCR information. If yes, such a packet is sent, the per_send_time is updated, and the virtual PCR is incremented at 408.

If the PCR_DERIVED is not equal to the per_send_time at 407, the TsMUX checks is there is any data in a queue for interleaving at 409. If both queues are empty, the TsMUX can insert a physical NULL packet which contains no data but still consumes the transmission bandwidth at 410 in order to maintain a constant bit rate. Alternatively, a virtual NULL packet can be inserted which consumes no bandwidth such that the other program sharing the transmission channel can use the spared bandwidth. In either scenario, the virtual PCR is incremented accordingly at 413.

Figure 5:
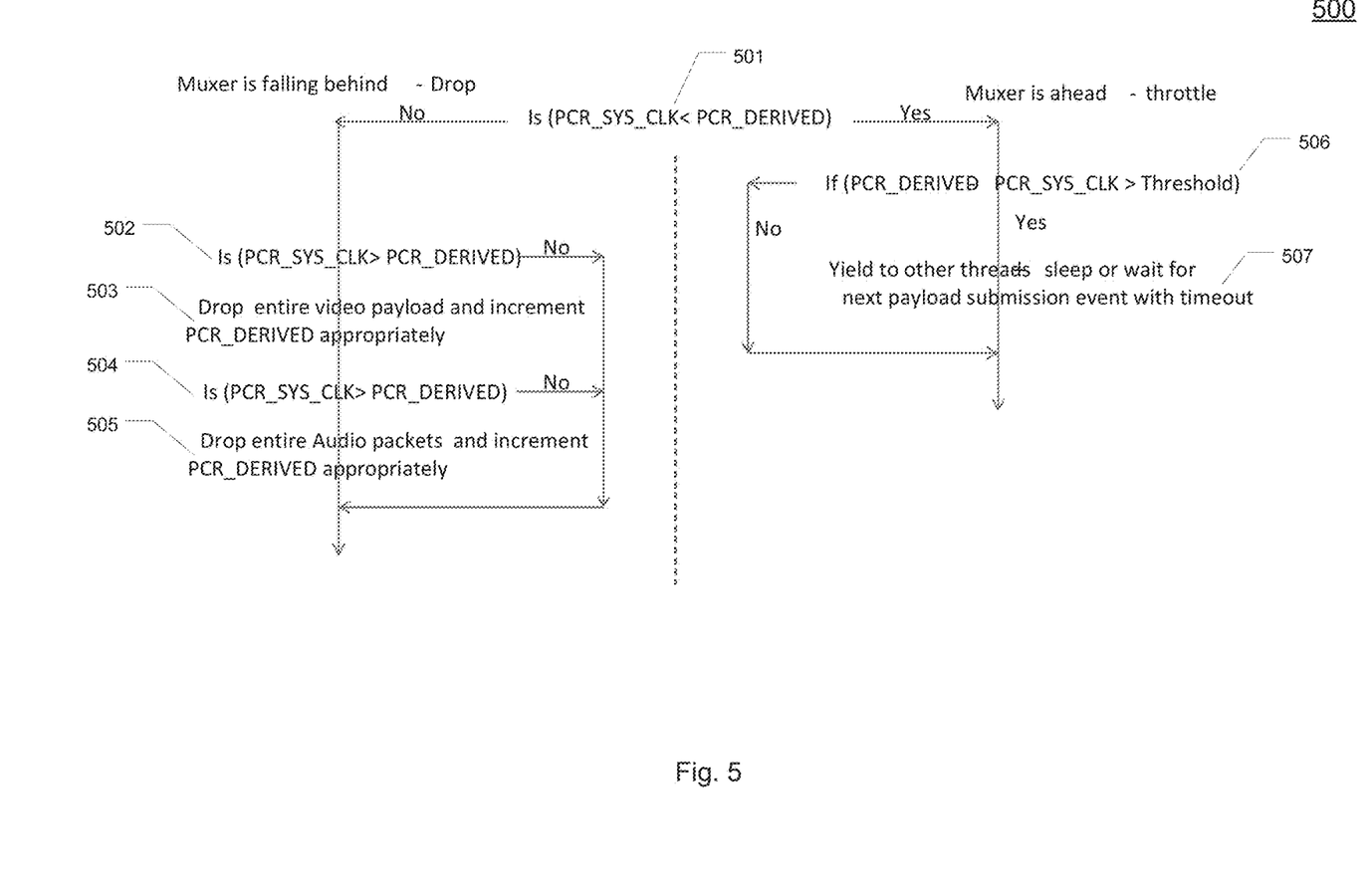
FIG. 5 is a flow chart depicting a packet dropping and throttling logic that can be employed in a TsMUX to synchronize the real-time audio/video playback on a sink device with the audio/video capture at the source device in accordance with an embodiment of the present disclosure.

However, if it is determined that either or both queues contain data, the TsMUX can generate the transport stream packets, copy to the output buffer at 412 and increment the PCR_DERIVED accordingly at 413. In some embodiment, the scheduler thread may wait for the output buffer to fill up before dispatching the packets to the socket. However, in some other embodiments, the packets can be dispatched as soon as a payload is consumed and multiplexed without waiting for the output buffer to be full. In this manner, video jitter may be advantageously reduced FIG. 5 is a flow chart depicting a packet dropping and throttling logic 500 that can be employed in a TsMUX to synchronize the real-time audio/video playback on a sink device with the audio/video capture at the source device in accordance with an embodiment of the present disclosure. The logic 500 is similar with 406 in FIG. 4. Instructions performing logic 500 may be executed by the scheduler thread in the TsMUX as discussed with reference to FIG. 1. If it is determined that the TsMUX is falling behind at 501, the scheduler thread can execute instructions performing the processes 502-505 to selectively drop packets in order to catch up with the virtual PCR. According to this embodiment, video payloads generally take the priority to be dropped over any audio payloads. If it is determined that (PCR_SYS_CLK>PCR_DERIVED) and so the system PCR is falling behind at 502, an entire video payload is dropped and the virtual PCR is incremented accordingly at 503. Steps 502 and 503 are repeated, e.g., until no video payloads are present in the video queues. Then if the TsMUX is still behind at determined at 504, an audio payload is dropped at 505. In some embodiments, measures are taken to prevent certain payloads from being dropped, for example, a video payload includes a reference video frame payload from a packet that includes a PES header.

On the other hand, if the virtual PCR is ahead of the system PCR, by at least a predetermined threshold as determined at 506, the TsMUX may suspend supplying transport stream to the socket. In this embodiment, scheduler thread may yield to other threads, e.g., of the other program and enter into a sleep mode or a power saving mode at 507 until the next packet submission event or for a predetermined interval. The foregoing 501-507 are repeated until the system PCR and the virtual PCR are synchronized.

Figure 6:
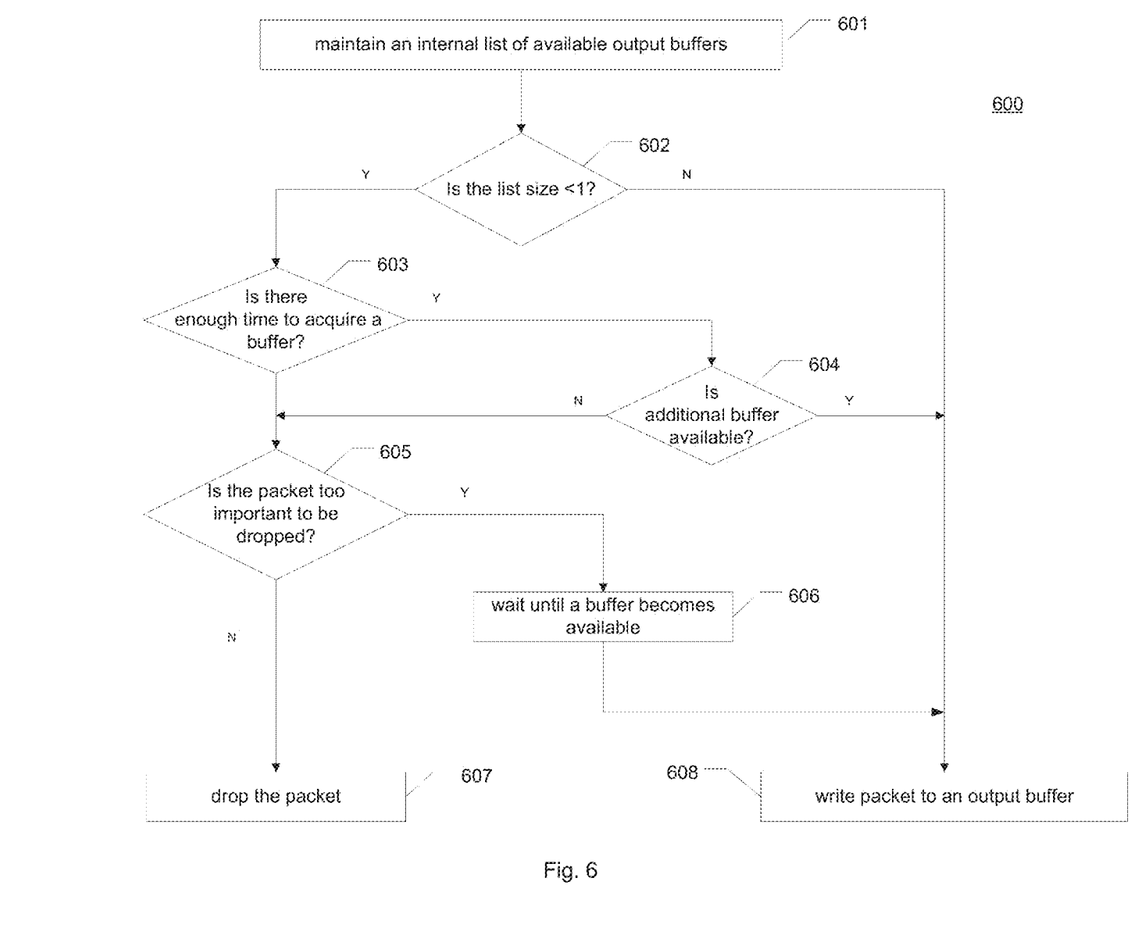
FIG. 6 is a flow chart illustrating an exemplary method of obtaining output buffer from a client program by a TsMUX in accordance with an embodiment of the present disclosure.

In some embodiments, when an output buffer is sent to a client socket program for transmitting and if the network is slow, the TsMUX will stall all subsequent operations until the socket has finished accepting the output buffer. Thus, the status of the output buffer can also be used as a network feedback. FIG. 6 is a flow chart illustrating an exemplary method 600 of obtaining an output buffer from a client program by a TsMUX in accordance with an embodiment of the present disclosure. At 601, the TsMUX can maintain an internal list of buffers that can be supplied by a corresponding application socket to copy the transport stream to. If the list size is greater than or equal to 1, meaning there are output buffers to receive next packet, the TsMUX can send the next packet to a buffer on the list at 608.

If the list size is less than 1 as determined in 602, and there is enough time to acquire a buffer without causing latency as determined at 603, and there is buffer available as determined at 604, the TsMUX can call for additional buffers, e.g., from the corresponding client program, and send the packet to the additional output buffer. However, if there is not enough time to acquire a buffer, the TsMUX determines whether the next packet is too important to be dropped, e.g. based on the information contained in a corresponding header. If yes, the TsMUX waits until an additional buffer becomes available at 606, and then sends the next packet to the additional buffer 608. If the packet is eligible for dropping, e.g. does not contain reference video frame data, or a PES header, the packet is dropped at 607.

Figure 7:
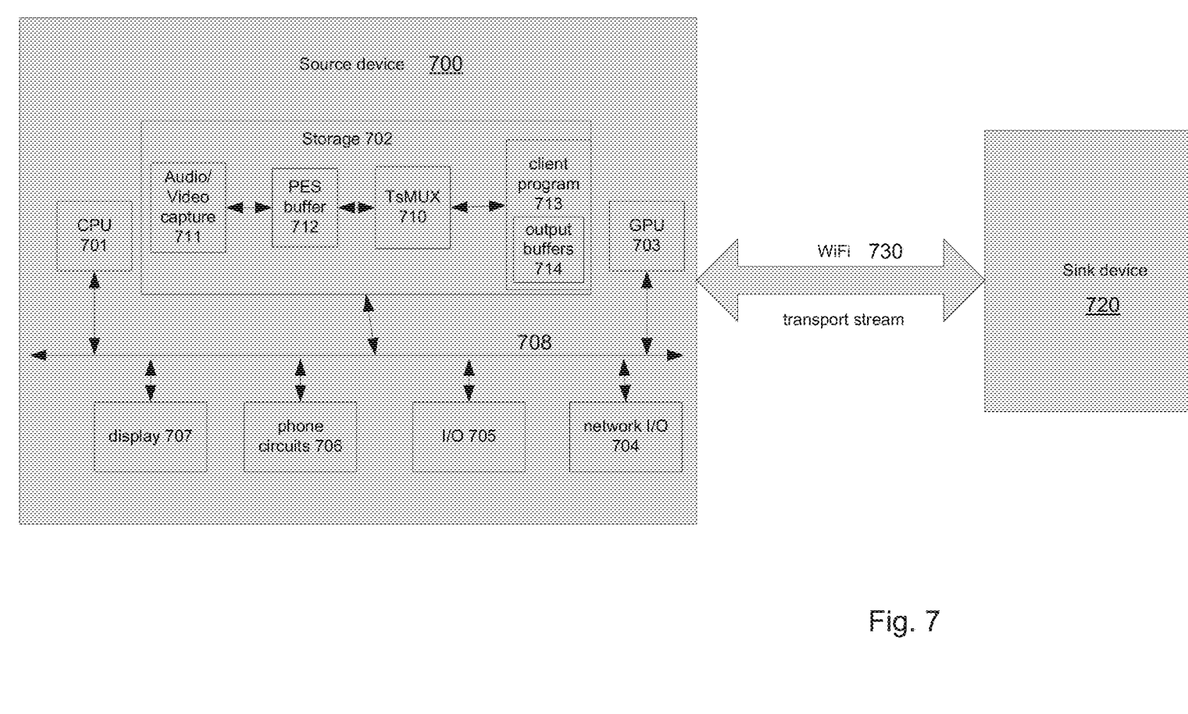
FIG. 7 is a block diagram illustrating an exemplary source device that includes a TsMUX capable of adapting an audio/video stream for real time transmission with reduced latency in accordance with an embodiment of the present disclosure.

FIG. 7 is a block diagram illustrating an exemplary source device 700 that includes a TsMUX 710 capable of adapting an audio/video stream for real time transmission with reduced latency in accordance with an embodiment of the present disclosure. The computing system comprises a processor 701, a storage 702, a GPU 703, I/O interfaces, network I/O 704, other I/O 705, a phone circuit 706, a display panel 707, and a bus 708. The storage 702 includes executable instructions of an audio/video program that supplies the original audio/video capture program 711, a PES buffer 712, a TsMUX 710 and a client program 713 that can allocated output buffers 714 to the TsMUX 710. The TsMUX 710 can adapt audio/video data supplied form the capture program 711 into a transport stream. As discussed in greater detail with reference to FIG. 4, the TsMUX can synchronize the playback at the sink device 720 with the packet generation at the source device 700 by dropping packets or throttling multiplexing or transmission in accordance with related time information.

The transport stream can be buffered at 713 and then send to the sink device 720 for multiplexing and playback by way of the WiFi network 730. In some embodiments, the source device and the sink devices may be both Miracast certified devices that can communicate with each other by virtue of Miracast. The source device 700 and the sink device 720 can be smart phones, laptops, smart TVs, video cameras, touch pads, game consoles, and so on. The TsMUX program can be implemented in Fortran, C++, or any other programming languages known to those skilled in the art.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method of transmitting an audio/video mixed signal over a communication network, said method comprising:
   accessing a packetized stream comprising audio payloads and video payloads;
   assigning said audio payloads in a audio queue and said video payloads in a video queue;
   converting said packetized stream into a transport stream comprising a plurality of packets that comprise interleaved audio packets and video packets, wherein each of said plurality of packets comprises a transport header and a payload;
   prior to transmission of said plurality of packets through said communication network, calculating a virtual clock reference based on a transmission bandwidth through said communication network with respect to said plurality of packets, wherein said virtual clock reference represents a scheduled time for transmitting a packet of said plurality of packets;
   prior to transmission of said plurality of packets through said communication network, deriving a time difference between said virtual clock reference and a system clock reference with respect to transmission of said plurality of packets through said communication network; and
   prior to transmission of said plurality of packets through said communication network and upon a determination that said time difference indicates that said virtual clock reference falls behind said system clock reference by at least a threshold, selectively dropping a number of payloads until said virtual clock reference and said system clock reference are determined to be synchronous.

2. The method of claim 1, wherein said selectively dropping comprises exclusively dropping payloads from selected video packets before dropping a payload from a selected audio packet.

3. The method of claim 2, wherein said selectively dropping further comprises one of avoiding dropping a payload from a video packet that comprises a reference video frame, and avoiding dropping a payload from a packet that comprises a packetized elementary stream (PES) header.

4. The method of claim 1 further comprising incrementing said virtual clock reference each time a payload is dropped or a packet is transmitted, and incrementing said system clock reference each time a packet is transmitted.

5. The method of claim 1 further comprising, upon a determination that said time difference indicates that said virtual clock reference is ahead of said system clock reference by at least said threshold, suspending transmission of said plurality of packets.

6. The method of claim 5, wherein said suspending transmission comprises causing a scheduler thread to enter a sleep mode for a predetermined time, or causing said scheduler thread to wait for a subsequent payload submission event.

7. The method of claim 1 further comprising, upon a determination that said time difference indicates said virtual clock reference is synchronous with said system clock reference, sending said transport stream less said number of payloads to an output buffer assigned to a client socket, and transmitting said transport stream from said output buffer to a remote display device through said communication network.

8. The method of claim 7 further comprising sending a physical or a virtual null packet while said audio queue and said video queue are empty, and incrementing said virtual clock reference accordingly.

9. The method of claim 7, wherein said transmitting said transport stream comprises transmitting said transport stream from said output buffer before said output buffer becomes full.

10. The method of claim 7 further comprising selectively dropping additional payloads upon a determination that an output buffer has no capacity to buffer incoming packets.

11. The method of claim 10, wherein said selective dropping additional payloads comprises, upon a determination that there is adequate time to acquire an additional output buffer, avoiding dropping a payload and waiting for an additional output buffer to become available.

12. A non-transitory computer-readable storage medium comprising instructions for transmitting signals over a wireless network, wherein said instructions, when executed by a processor, cause said processor to perform a method of:
receiving a packetized elementary stream (PES) comprising audio payloads and video payloads;
enqueuing said audio payloads in a audio queue and said video payloads in a video queue;
inserting a header to said PES;
packetizing said PES into a plurality of transport packets that comprise multiplexed audio packets and video packets; wherein each of said plurality of transport packets comprises a transport header and a payload;
prior to transmission of said plurality of transport packets through said communication network, calculating a virtual clock reference based on a transmission bandwidth of said wireless network, wherein said virtual clock reference represents a scheduled time for transmitting a packet of said plurality of transport packets;
prior to transmission of said plurality of transport packets through said communication network, deriving a time difference between said virtual clock reference and a system clock reference;
prior to transmission of said plurality of transport packets through said communication network and upon a determination that said time difference indicates that said virtual clock reference falls behind said system clock reference by at least a threshold, selectively dropping a number of payloads until said virtual clock reference and said system clock reference is determined to be synchronous.

13. The non-transitory computer-readable storage medium of claim 12, wherein said method further comprises:
upon a determination that said time difference indicates that said virtual clock reference is synchronous with said system clock reference, sending transport packets to an output buffer associated with a network interface circuit; and
upon a determination that said time difference indicates that said virtual clock reference is ahead of said system clock reference by at least a threshold, pausing sending transport packets to said output buffer.

14. The non-transitory computer-readable storage medium of claim 13, wherein said selective dropping comprises precluding a packet comprising said header or a reference video frame from being dropped; and dropping payloads from selected video packets before dropping a payload from a selected audio packet.

15. The non-transitory computer-readable storage medium of claim 13, wherein said method further comprises: incrementing said virtual clock reference each time a payload is dropped or a packet is transmitted; and incrementing said system clock reference each time a packet is transmitted.

16. The non-transitory computer-readable storage medium of claim 13, wherein said method further comprises: sending a virtual null packet that takes up no transmission bandwidth while said audio queue and said video queue are empty; and incrementing said virtual clock reference.

17. The non-transitory computer-readable storage medium of claim 13, wherein said transmitting said transport stream comprises transmitting said transport stream before said output buffer becomes full.

18. A device operable to transmit audio/video payloads to a remote computing device through a communication network, said device comprising:
a processor;
a network circuit enabling said device to access with said communication network;
a memory coupled with said network circuit, said memory operable to store instructions that, when executed by said processor, perform a method of:
accessing a packetized stream comprising audio payloads and video payloads;
enqueuing said audio payloads in a audio queue and said video payloads in a video queue;
inserting a header to said packetized stream;
packetizing said packetized stream into a plurality of transport packets that comprise multiplexed audio packets and video packets, wherein each of said plurality of transport packets comprises a transport header and a payload;
prior to transmission of said plurality of transport packets through said communication network, calculating a virtual clock based on a transmission bandwidth of said communication network, wherein said virtual clock represents a scheduled time for transmitting said packet of said plurality of transport packets;
prior to transmission of said plurality of transport packets through said communication network, deriving a time difference between said virtual clock and a system clock with respect to transmission of said plurality of transport packets; and prior to transmission of said plurality of transport packets through said communication network and upon a determination that said time difference indicates that said virtual clock falls behind said system clock by at least a threshold latency, selectively dropping a number of payloads until said virtual clock and said system clock is determined to be synchronous.

19. The device of claim 18, wherein said method further comprises:

upon a determination that said time difference indicates that said virtual clock is synchronous with said system clock, sending transport packets to an output buffer associated with a network interface circuit; and upon a determination that said time difference indicates that said virtual clock is ahead than said system clock by at least a threshold latency, pause sending transport packets to said output buffer.

20. The device of claim 19, wherein said selective dropping a number of payloads comprises: precluding a packet comprising said header or a reference video frame from being dropped; and dropping payloads from selected video packets before dropping a payload from a selected audio packet.

21. The device of claim 19, wherein said method further comprises incrementing said virtual clock each time a payload is dropped or a packet is transmitted, and incrementing said system clock each time a packet is transmitted.

22. The device of claim 19, wherein said method further comprises sending a virtual null packet that consumes no transmission bandwidth while said audio queue and said video queue are empty, and incrementing said virtual clock.

* * * * *